United States Patent
Cook

(10) Patent No.: US 10,997,884 B2
(45) Date of Patent: May 4, 2021

(54) REDUCING VIDEO IMAGE DEFECTS BY ADJUSTING FRAME BUFFER PROCESSES

(71) Applicant: Nvidia Corporation, Santa Clara, CA (US)

(72) Inventor: David Cook, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 262 days.

(21) Appl. No.: 16/174,600

(22) Filed: Oct. 30, 2018

(65) Prior Publication Data

US 2020/0135075 A1 Apr. 30, 2020

(51) Int. Cl.
*G09G 5/36* (2006.01)
*G09G 3/00* (2006.01)
(Continued)

(52) U.S. Cl.
CPC ............ *G09G 3/007* (2013.01); *A63F 13/25* (2014.09); *G09G 5/003* (2013.01); *G09G 5/363* (2013.01);
(Continued)

(58) Field of Classification Search
CPC ........ G09G 3/007; G09G 5/363; G09G 5/003; G09G 2320/103; G09G 2320/0252;
(Continued)

(56) References Cited

U.S. PATENT DOCUMENTS 5,502,462 A * 3/1996 Mical ................ G09G 5/02
345/553
5,850,232 A 12/1998 Engstrom et al.
(Continued)

FOREIGN PATENT DOCUMENTS

CN 106303249 A 1/2017
EP 1037134 A2 9/2000
(Continued)

OTHER PUBLICATIONS

Jerald; "Scene-Motion- and Latency-Perception Thresholds for Head-Mounted Displays"; Chapel Hill 2010; 207 pgs.
(Continued)

*Primary Examiner* — Carolyn R Edwards

(57) ABSTRACT

The present disclosure is directed to a method to correct for visual artifacts in a virtual reality (VR) video image where there is significant motion of the video image as a result of user actions. A user may request that the video image be moved, such as a through motion detected through a VR device, i.e., turning the head, or through a request to an application, i.e., joystick feedback to a gaming application. The video image motion can cause stutter and jitter visual artifacts, when the video frame buffer uses a synchronization constraint, such as vertical synchronization (VSync). When the VSync is disabled, a tearing visual artifact can be present. This disclosure presents a frame buffer handling process that operates with VSync disabled. The process allows the display refresh rates to operate at higher frequencies, while correcting for significant motion of the video image, i.e., tearing, through shifting back certain pixels within the scanout frame buffer.

25 Claims, 5 Drawing Sheets

(51) Int. Cl.
  *G09G 5/00* (2006.01)
  *A63F 13/25* (2014.01)
  *G06F 3/01* (2006.01)
  *A63F 13/212* (2014.01)
  *A63F 13/803* (2014.01)
(52) U.S. Cl.
  CPC ........... *A63F 13/212* (2014.09); *A63F 13/803* (2014.09); *A63F 2300/1012* (2013.01); *A63F 2300/30* (2013.01); *A63F 2300/8017* (2013.01); *G06F 3/012* (2013.01); *G09G 2320/0252* (2013.01); *G09G 2320/0261* (2013.01); *G09G 2320/103* (2013.01); *G09G 2356/00* (2013.01); *G09G 2360/18* (2013.01)
(58) Field of Classification Search
  CPC .......... G09G 2360/18; G09G 2356/00; G09G 2320/0261; A63F 13/25; A63F 2300/1012; A63F 2300/8017; A63F 13/212; A63F 2300/30; A63F 13/803; G06F 3/012
  See application file for complete search history.

(56) References Cited

U.S. PATENT DOCUMENTS

| | | | |
|---|---|---|---|
| 6,911,983 B2 | 6/2005 | Sabella et al. | |
| 7,176,982 B2* | 2/2007 | Zhu | H04N 5/21 348/619 |
| 8,847,970 B2* | 9/2014 | Belanger | G09G 5/397 345/545 |
| 8,866,833 B2* | 10/2014 | Petersen | G09G 5/12 345/545 |
| 8,964,041 B2 | 2/2015 | Forssen et al. | |
| 9,854,170 B2* | 12/2017 | Katz | H04N 5/23267 |
| 2003/0174137 A1* | 9/2003 | Leung | G09G 5/39 345/531 |
| 2013/0147928 A1* | 6/2013 | Woo | H04N 13/128 348/51 |
| 2016/0189429 A1* | 6/2016 | Mallinson | H04N 13/398 345/633 |
| 2018/0182273 A1 | 6/2018 | Hwang et al. | |

FOREIGN PATENT DOCUMENTS

| | | |
|---|---|---|
| EP | 3110516 A2 | 1/2017 |
| GB | 2559864 A | 8/2018 |
| WO | 2018140230 A1 | 8/2018 |
| WO | 2018143770 A1 | 8/2018 |
| WO | 2018154130 A1 | 8/2018 |

OTHER PUBLICATIONS

Srinivasan; "Adaptive Frameless Rendering"; North Carolina State University; Computer Science; 2016; 48 pgs.

Jerald; "Latency Compensation for Head-Mounted Virtual Reality"; University of North Carolina at Chapel Hill; Department of Computer Science; May 14, 2004; 16 pgs.

* cited by examiner

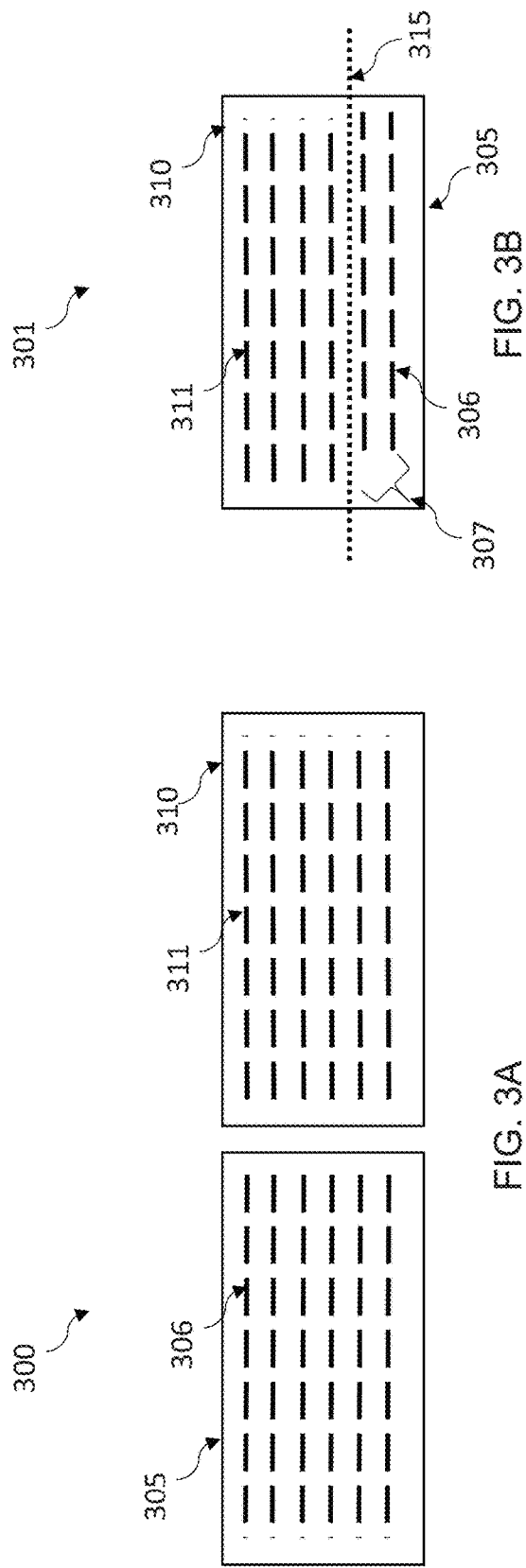
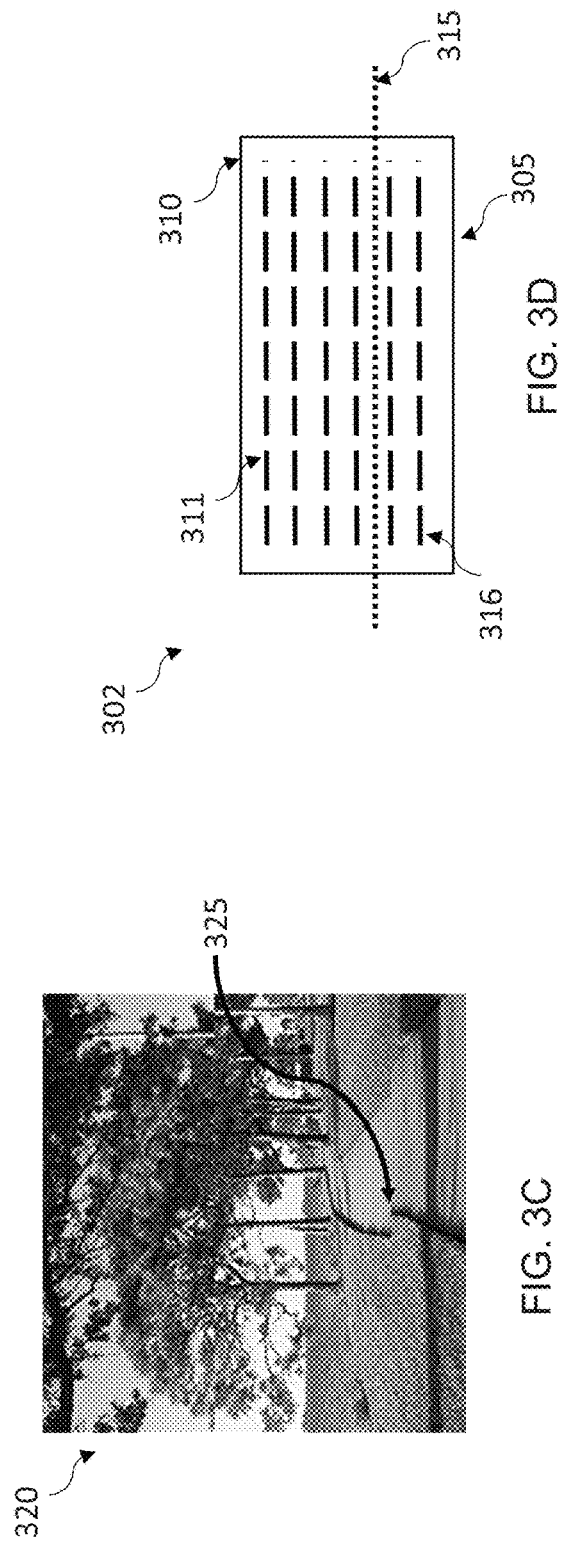

REDUCING VIDEO IMAGE DEFECTS BY ADJUSTING FRAME BUFFER PROCESSES

TECHNICAL FIELD

This application is directed, in general, to a video image rendering process and, more specifically, to compensating for image movement during the video image buffer handling process.

BACKGROUND

Processing video can use different rendering and buffer handling algorithms. Certain algorithms can utilize the display device's specifications and some algorithms can utilize how fast the video processor can render each frame of the video. The frames per second (FPS) capability of the display device can be different than the rendering FPS, especially in situations where complex frames are to be rendered. This can cause the rendering process of the video image to be out of synchronization with the scanout process to the display.

The video processor can make decisions on how to handle the buffers used to hold each frame of video as they are rendered and scanned out to the display device. Such selections can include determining when the buffers are swapped between the render buffer and the scanout buffer. For example, the swap can occur when the render buffer has completed its update or when the scanout buffer has completed its scan out. In both scenarios, the state of the other respective buffer may not be considered. Other points in time during the processing can also be selected.

When the render buffer overlays the scanout buffer at a time when the scanout buffer has remaining video frame data to send to the display, visual artifacts can be introduced into the video, such as tearing. Tearing is the visual artifact that occurs when part of a frame image is offset from another part of the frame image. The visual artifacts can detract from the overall user's visual experience. Tearing can occur, for example, at a time when the user input dictates significant movement of the video scene in a short interval of time.

SUMMARY

The scene or objects within the scene can move more rapidly than the display system can show. An object can appear to jump from one location to another within the scene when the display is not able to show the intermediate frames of the object moving between those two locations. In another scenario, those intermediate frames can be generated, i.e., rendered, by a graphics system, but the display system may not be fast enough to show each of those frames in their respective turn. In this scenario, the scene can be an amalgamation of one or more rendered frames of video. The different frames of video used in the amalgamation may not align along an object's visualization in the scene. The object can appear to be split between its top and bottom portions, such as if the top portion is from one rendered frame and the bottom portion is from a different rendered frame. This can cause a tearing type artifact of the displayed video image.

The described process can detect and correct these potential artifacts prior to the video being sent to the display device. The video generating process can detect how rapidly a scene is moving. This movement can be detected or received from a device, such as a VR headset. Based on the amount of movement and the direction of the movement, the process can estimate by how much, meaning by how many pixels, the scene is going to shift and in which direction. This number of pixels can be used to compute a shift back value of a portion of a subsequent frame of the video image. By shifting the portion of the subsequent video frame back the computed number of pixels, the visual artifacts described above can be reduced. This can improve the user's visual experience of the displayed video images.

In one aspect, a method to adjust a video image frame is disclosed. In one embodiment, the method includes: (1) determining an effect of a video scene movement, (2) calculating a shift back parameter utilizing a first frame buffer and a second frame buffer, wherein the first frame buffer comprises scanlines corresponding to a first video image frame and the second frame buffer comprises scanlines corresponding to a second video image frame, and the second frame buffer is assigned as a current scanout buffer, and (3) applying a shift back process on a set of scanlines of the second frame buffer by utilizing the shift back parameter, the set of scanlines corresponding to an equivalent set of unscanned scanlines from the first frame buffer, further wherein a frame buffer operation synchronization constraint is disabled.

In another aspect, a computer program product having a series of operating instructions stored on a non-transitory computer-readable medium that directs a data processing apparatus when executed thereby to perform operations to adjust a video image frame buffer is disclosed. In one embodiment, the computer program product includes: (1) determining an effect of a video scene movement, (2) calculating a shift back parameter utilizing a first frame buffer and a second frame buffer, wherein the first frame buffer comprises scanlines corresponding to a first video image frame and the second frame buffer comprises scanlines corresponding to a second video image frame, and said second frame buffer is assigned as a current scanout buffer, and (3) applying a shift back process on a set of scanlines of the second frame buffer by utilizing the shift back parameter, said set of scanlines corresponding to an equivalent set of unscanned scanlines from the first frame buffer, further wherein a frame buffer operation synchronization constraint is disabled.

In another aspect, a video image frame adjustment system is disclosed. In one embodiment, the video image frame adjustment system includes: (1) a buffer handler operable to direct frame buffer operation, (2) a video renderer operable to render one or more video image frames and store the video image frames in a buffer by utilizing the buffer handler, and (3) a video adjustor operable to adjust a set of scanlines of a rendered second video image frame from the video renderer utilizing a rendered first video image frame from the video renderer when the second video image frame is stored in the buffer the set of scanlines corresponds to an equivalent set of unscanned scanlines of the first video image frame, further wherein the frame buffer operation indicates a disabled synchronization constraint.

BRIEF DESCRIPTION

Reference is now made to the following descriptions taken in conjunction with the accompanying drawings, in which:

FIG. 3A is an illustration of a diagram of an example video double buffer;

FIG. 3B is an illustration of a diagram of an example overlaid scanout buffer frame;

FIG. 3C is an illustration of a video frame of an example tearing of an image;

FIG. 3D is an illustration of a diagram of an example adjusted overlaid scanout buffer frame;

DETAILED DESCRIPTION

Figure 1A:
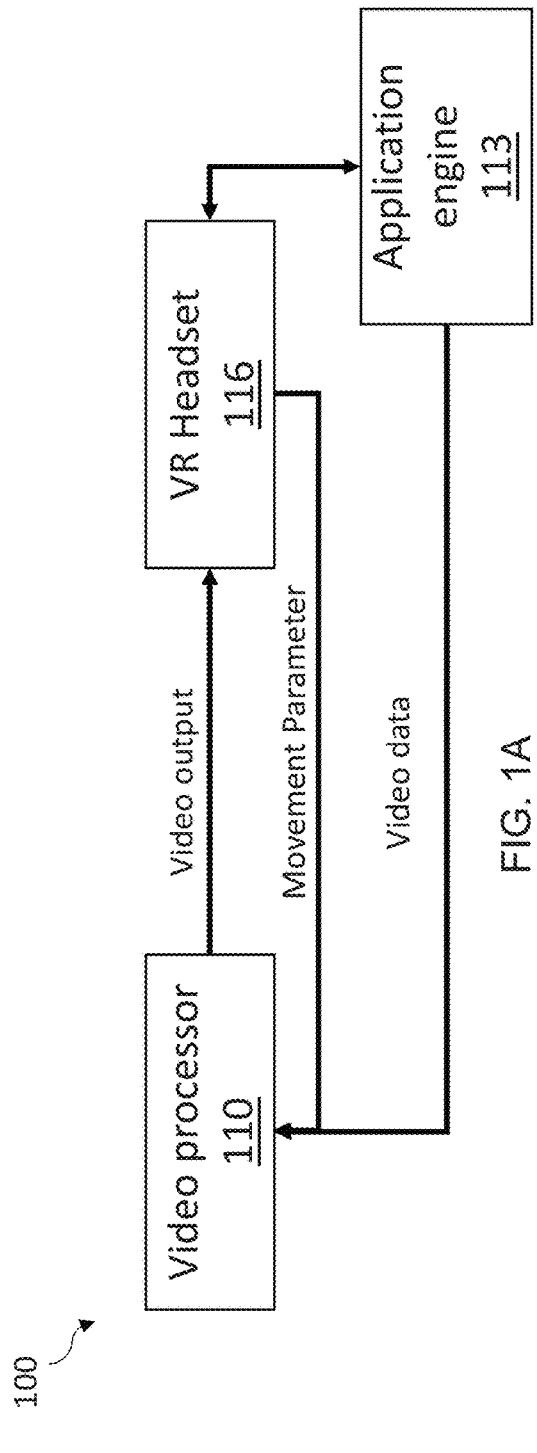
FIG. 1A is an illustration of a block diagram of an example virtual reality display system.

When executing an application that generates a video on a display—whether a conventional monitor, a virtual reality (VR) headset, and other types of display devices—certain types of problems, i.e., visual artifacts, can occur. A user can be playing an action game, such as a driving or flying game, or the user can be experiencing VR playback of a scene or using a VR application or game. When the user moves their view perspective (for example, using a VR device) or when the user causes movement within the game environment (for example, hitting a key or moving a joystick), the video rendered to show the movement can experience visual artifacts.

Some other examples of the visual artifacts addressed herein are stutter, jitter, judder, and tearing. For example, a user can experience a sudden disappearance and reappearance of objects in a video from one location to another, an object can bounce between two locations very quickly, or a displayed scene may not be aligned properly. This can occur such as when the top portion of the displayed video image frame is offset from a bottom portion of the same video image frame. When subsequent video image frames are displayed, the visual artifact can disappear. Even at fast display rates, i.e., refresh rates, these visual artifacts can be noticeable by a user and can detract from the overall visual experience.

These visual artifacts can occur when the movement by a user, within the application environment, is proportionately fast compared to the computational speed of the device rendering the video, i.e., the amount of shifting of a displayed object within the video frame is large compared to the video image processing rate. Factors that can determine whether a user experiences a visual artifact can be the frequency at which the display device refreshes the video images, and the frequency at which the video images are rendered. Display devices can vary in the frequency at which they can refresh each video image frame, for example, 60 hertz (Hz), 90 Hz, and other values. This can also be referred to as the frames per second (FPS) of displayed video. The application rendering process, i.e., creating the next video image frame in sequence, also has a FPS capability. The complexity of the video image frame can affect the FPS, as more complex calculations can reduce the ability of the rendering process to maintain a targeted FPS.

An application can determine that a video image frame should be rendered. The video processing system can render that frame and place it in a buffer. At this point in time, the buffer can be called the render buffer. At a determined time, the render buffer is switched to become the scanout buffer and the previous scanout buffer becomes the render buffer for the next video image frame, e.g., swapping the two buffers. The scanout buffer is used to send the video image frame to the display device. This is the conventional double buffering technique. In alternative aspects, there can be more than two buffers, for example, three buffers used in a round robin pattern, or additional buffers to handle the two view perspectives of a VR display. On scanout, the video image frame is sent to the display device by lines. For example, a display device having a resolution of 1920 pixels by 1080 pixels can have 1080 lines in the scanout buffer to send to the display device.

Due to image frame rendering complexity, as a result of application or system constraints, the rendering of a video image frame can be slower than the device display refresh rate. This can result in the render buffer not being completely updated at a time when the scanout buffer has completed sending out all of the scanlines. The video processing system can wait until the render buffer has completed the update before switching the buffers. The user may experience a delay in the visual experience. Alternatively, the video processing system can switch the buffers without waiting. The user may experience the top portion of the video image frame from the new rendering process and the bottom portion of the video image frame from the rendering process rendered two frames previously.

A third alternative is that the visual artifacts can be introduced when the rendering is not in synchronization with the display device. For example, if the render buffer is completely updated and the scanout process remains in progress, the rendering process can start updating the render buffer with the next video image frame. The render buffer may be partially updated with the subsequent video image frame when the scanout process completes and the buffers are switched. The user may experience the top portion of the video image frame from a video image that is one frame ahead of the video image on the bottom portion of the video image frame. Other combinations and factors can be possible as well.

Controlling when the buffers are switched during the video image frame rendering process is important in reducing the visual artifacts experienced by the user. Vertical synchronization (VSync) is a display option that allows an application to synchronize the FPS for rendering the video image frames with the display device's FPS for better visual experience stability. When the VSync is on, some of the above described visual artifacts can occur if the rendering FPS slows down relative to the display device's FPS. When the VSync is turned off, i.e., disabled, a higher rendering FPS may be obtainable but may introduce other types of visual artifacts in the video images.

This disclosure demonstrates a method of allowing the rendering process to execute independently of the scanout process, i.e., VSync is disabled. In addition to VSync, there are other frame buffer operation processes—such as G-Sync from Nvidia Corporation of Santa Clara, Calif.—where the display device's FPS corresponds to the rendering FPS. These other frame buffer operation processes can also be disabled if present on the system to enable the methods as described herein. VSync, G-Sync, and other frame buffer operation processes can be referenced as synchronization constraints. When these processes are enabled, they constrain the video processing system to use a specific type of frame buffer operation, i.e., they can control the render buffer synchronization with the display (scanout) buffer.

During the buffer switch process, scanlines in the newly designated scanout buffer that have not yet been scanned out during the current display refresh cycle are shifted back, i.e., the unscanned set of scanlines in the newly designated scanout buffer that correspond to an equivalent unscanned set of scanlines in the previous scanout buffer are shifted back. The shift back can move the pixels in the opposite direction of movement of the scene. For example, a VR headset wearing user can quickly turn their head to the right. In response, the shift back can proportionately shift the new scanline pixels to the left so that the new scanlines are more closely aligned with the previous scanlines, thereby reducing potential visual tearing of the scene.

For example, the scanout buffer can have 1080 horizontal scanlines. Scanlines 1 through 900 can be scanned out to the display device. At this point in time, the rendering process has completed updating the render buffer. The buffers can be switched. The scanout process can continue scanning out from scanline 901 to the end using the newly designated scanout buffer (which was the previous rendering buffer). If the user caused significant movement to occur in the scene, then the video image from the previous scanout buffer may not match the video image from the current scanout buffer. Objects and scenery can be split, causing visual tearing. To reduce this visual artifact, the scanlines 901 through 1080 can be shifted back a proportionate number of pixels, in the opposite direction that the user caused the scene to move. The shift back process reduces the video image alignment gap between the video images, and may potentially eliminate the video image alignment gap altogether.

To determine the proportion of shift back pixels, the process can utilize a movement parameter. The movement parameter can indicate the speed and direction that the user is requesting the scene to move. For example, in a VR system, the VR device or another device may have sensors that can detect and measure motion by the user and send that motion as the movement parameter to the video processor. In a computing device system, the video processor can call an application programming interface (API) of the application running on the computing device and receive back the movement parameter. Other communication types are possible.

The movement parameter can be utilized to calculate the shift back parameter using a proportion. For example, if the movement parameter indicates that the second video image frame is visually moved within the scene 10 pixels from the first video image frame, then the shift back parameter can be 10 pixels. This can result in the objects and scenery being displayed without showing a tearing visual artifact. Faster user requested movements, such as flying an airplane at supersonic speeds, can result in larger pixel shifts. Slower movements can result in smaller pixels shifts.

In an alternative aspect, there can be more than one render and scanout buffer swap during a single scanout process time interval. This can occur when the rendering process FPS is a multiple faster than the scanout process FPS. For example, the multiple faster parameter can be 2, 3, 4, or more times faster. The multiple faster parameter can be a decimal multiple as well. The example herein will use a whole number for demonstration purposes. The multiple faster parameter can result in multiple buffer swaps during the scanout process. Each buffer swap corresponds to a new video image frame in the scanout buffer.

At the time the buffers are swapped a visual artifact such as tearing can occur at each of the then current scanout positions in the scanout buffer. The number of buffer swaps, and therefore the number of potential visual artifacts, can vary based on the multiple faster parameter. There can be a computed shift back parameter for each visual artifact position. The shift back parameters can be the same value and direction, different values and directions, or a combination. For example, very fast shaking motion can result in tearing artifacts in the various directions and intensities of the motion. The multiple shift back parameters can be stored in a shift back parameter array, where each position of the array corresponds to a respective video image frame of the scanout buffer, i.e., a visual artifact position in the scanout buffer.

In another alternative aspect, the system can process one or more video image frames where the one or more video image frames are included together in the render and scanout buffers. For example, in a game or application that includes movement from a vehicle such as a car, plane, or spaceship, there can be a first video image frame for the perspective of a user facing forward and a second video image frame from a perspective of a rearward facing camera. There can be more than two video image frames, as determined by the application. Each of the video image frames are included in the render and scanout buffers for processing to the display device. Each video image frame can utilize the same or different shift back parameters, so that the shifting back for each video image frame can be independent of the shifting back of the other video image frames. There can be an array of shift back parameters, where each element of the array corresponds to one of the video image frames. This can allow, continuing the example above, the forward view perspective to be shifted-back in one direction, and the rear view camera perspective to be shifted-back in another direction.

The application that is requesting the rendering of the video image frames can determine the type of buffer handling that is used. In preferred embodiments, the application can determine the frame buffer operations depending on the scene, and based on factors such as (and without limitation) what is occurring, and how fast the user is requesting the scene to shift, etc. The frame buffer operations can include selecting the VSync option on or off; selecting an algorithm to utilize (such as asynchronous time warp or "ATW"); and selecting the methods as described herein. These selections can be made at the start-up of the application or during execution of the application. These selections can change as the application executes. ATW is a technique that can generate intermediate video image frames in situations when the application cannot maintain a certain FPS, which can assist to reduce judder.

Turning now to the figures, FIG. 1A is an illustration of a block diagram of an example VR display system 100. VR display system 100 can be used by a user to view a scene, to play a game, or for other uses. VR display system 100 includes a video processor 110, an application engine 113, and a VR headset 116. The application engine 113 can provide video data with the user's actions and requests to the video processor 110 utilizing the application's logic. Application engine 113 can also instruct the video processor 110 as to the type of video optimizations to use and which buffer handling algorithm to use.

VR headset 116 (or another detecting device) can detect movement of the user and can send that movement data to the video processor 110 (viz. to the video driver). Video processor 110 can receive the video data and the video handling instructions from the application engine 113, receive the movement parameter from the VR headset 116, and then render video image frames utilizing this information.

Figure 1B:
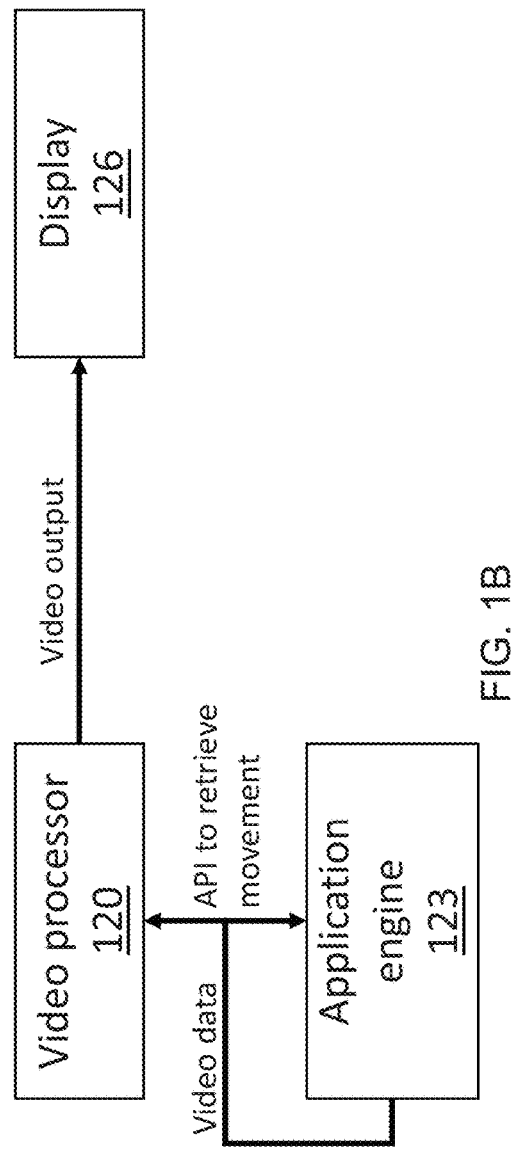
FIG. 1B is an illustration of a block diagram of an example computing display system.

FIG. 1B is an illustration of a block diagram of an example computing display system 101. Computing display system 101 can be used by a user to execute an application, for example, running a game on a laptop computer. Computing display system 101 includes a video processor 120, an application engine 123, and a display 126. The application engine 123 can provide video data to the video processor 120 utilizing the application's logic, and the user's actions and requests. Application engine 123 can also instruct the video processor 120 as to the type of video optimizations to use and which buffer handling algorithm to use.

Video processor 120 can call an API to retrieve the movement parameter information from the application. Video processor 120 can receive the video data and the video handling instructions from the application engine 123, receive the movement parameter from the API call, and then render video image frames utilizing this information.

VR display system 100 and computing display system 101 demonstrate an example functional view of the processes and is not intended to limit the physical implementation of these processes. These components can be combined or separated. For example, application engine 113 and video processor 110 can be included in VR headset 116. The application engines 113 and 123 can reside within the same or different computing devices as respective video processors 110 and 120. Other combinations are possible as well.

Figure 2:
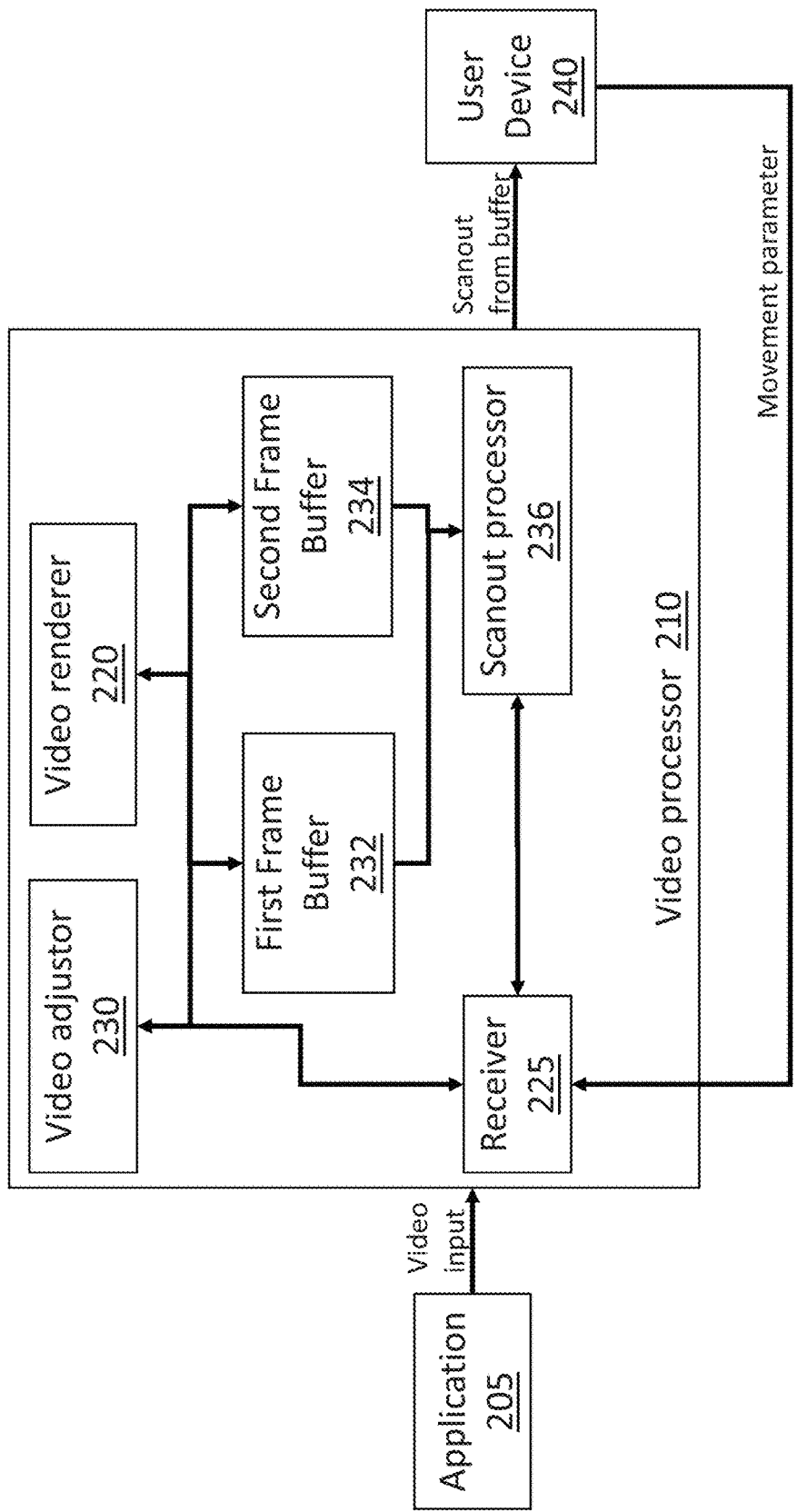
FIG. 2 is an illustration of a block diagram of an example frame adjustment system.

FIG. 2 is an illustration of a block diagram of an example frame adjustment system 200. Frame adjustment system 200 can be used to adjust the scanlines in the scanout buffer using received movement data to reduce visual artifacts. Frame adjustment system 200 includes an application 205, a video processor 210, and a user device 240. Video processor 210 further includes a video renderer 220, receiver 225, video adjustor 230, first frame buffer 232, second frame buffer 234, and a scanout processor 236.

An application 205 can cause a video to be displayed on a user device 240. For example, a game playing on a computer display or a video playback on a VR headset, and other combinations. Application 205 can send the video input, i.e., image frame data, to the video processor 210. In addition to the image frame data, the video input from application 205 can include a buffer handling parameter to instruct the video processor 210 on how to handle the frame buffer operations, such as switching of buffers and the scanout process.

Receiver 225 can receive the video input and provide the video input to a conventional video renderer 220 to render the frame image. Receiver 225 can also receive a movement parameter from a user device, such as through a wireless connection, a universal serial bus (USB) connection, an API call, or another conventional communication method.

Video renderer 220 can store the rendered frame in one of the first frame buffer 232 and second frame buffer 234. Receiver 225 can send the buffer handling parameter to the video adjustor 230. Video adjustor 230 can adjust the scanlines in one or both of the first frame buffer 232 and second frame buffer 234. The first frame buffer 232 and the second frame buffer 234 can be alternately designated as the render buffer and the scanout buffer, as the video processing proceeds. The first frame buffer 232 and the second frame buffer 234 switch designations as the video processor operates.

The scanout processor 236 can send the scanlines, for the current frame, from the current scanout buffer to the user device 240. The scanout buffer and the render buffer can be switched during the scanout process. The scanout processor 236 will continue to send the appropriate scanline from the newly swapped scanout buffer so that the current frame has all appropriate scanlines sent to the user device 240. The scanout processor 236 can receive buffer handling parameters from receiver 225 to adjust how the scanout process is handled with respect to the buffer refresh rates and the user device 240 refresh rates.

Frame adjustment system 200 is a representation of the functional aspects of this disclosure. The functions described within the video processor 210 can be handled by one or more system processes, by one or more processor chips, or a combination thereof. For example, video processor 210 can be a graphics processing unit (GPU) and the method included in a video driver executing on the GPU. Video processor 210 can be located on the same computing device as the application 205, the user device 240, located proximate to application 205 or user device 240, or located a distance away, such as in a data center, a cloud service, or a computing server. The application 205, video processor 210, and the user device 240 can be the same or separate computing device.

FIG. 3A is an illustration of a diagram of an example video double buffer 300. Video double buffer 300 demonstrates a conventional example scenario of rendering and scanning out a frame of video. Video double buffer 300 includes a render buffer data portion 305 holding video image frame data in scanlines 306. Also included is scanout buffer data portion 310 which holds video image frame data in scanlines 311.

FIG. 3B is an illustration of a diagram of an example overlaid scanout buffer frame 301. Overlaid scanout buffer frame 301 is demonstrating what can occur during the scanout process when VSync is off. Scanlines 311 have been scanned out to the display device. Dotted line 315 indicates the point where the scanout buffer data portion 310 and the render buffer data portion 305 have been swapped. The scanlines 311 are from the original scanout buffer (now designated the render buffer). Scanlines 306 are from the newly designated scanout buffer (previously the render buffer). The scanlines 306 are the scanlines not yet scanned out to the device display for the current video image frame. Scanlines 306, since they were rendered from a subsequent video image frame from scanlines 311, can visually show a shift in position due to movements requested by the user. This is demonstrated in the visual example by shift 307.

FIG. 3C is an illustration of a video frame of an example tearing of an image 320. Without a correction, the output of the video image frame from scanout buffer data portion 310 can visually appear as image 320. Tear 325 can be visually apparent in the image 320. Visual artifact tear 325 can lessen the user's visual experience.

FIG. 3D is an illustration of a diagram of an example adjusted overlaid scanout buffer frame 302. Adjusted overlaid scanout buffer frame 302 includes the same scanout buffer data portion 310 with scanlines 311 overlaid with the new scanout buffer data portion 305 with adjusted scanlines 316. Dotted line 315 represents the switch between buffers during the frame scanout process to the display device. Adjusted scanlines 316 have been adjusted according to the methods in this disclosure. For example, the amount of shift represented by shift 307 can be used to determine a shift back parameter. Shift 307 can be created when there is a rapid movement of the scene, as described above. The shift back parameter can be equal to shift 307 or a proportion of shift 307. Adjusted overlaid scanout buffer frame 302 is demonstrating a shift back parameter approximately equal to the shift 307. Utilizing the computed shift back parameter, the scanlines 306 have been shifted back to as represented the adjusted scanlines 316. The shift 307 shown in overlaid scanout buffer frame 301 is no longer present in the adjusted overlaid scanout buffer frame 302. The new frame video image data can be displayed while minimizing the visual artifacts apparent to the user.

Figure 4:
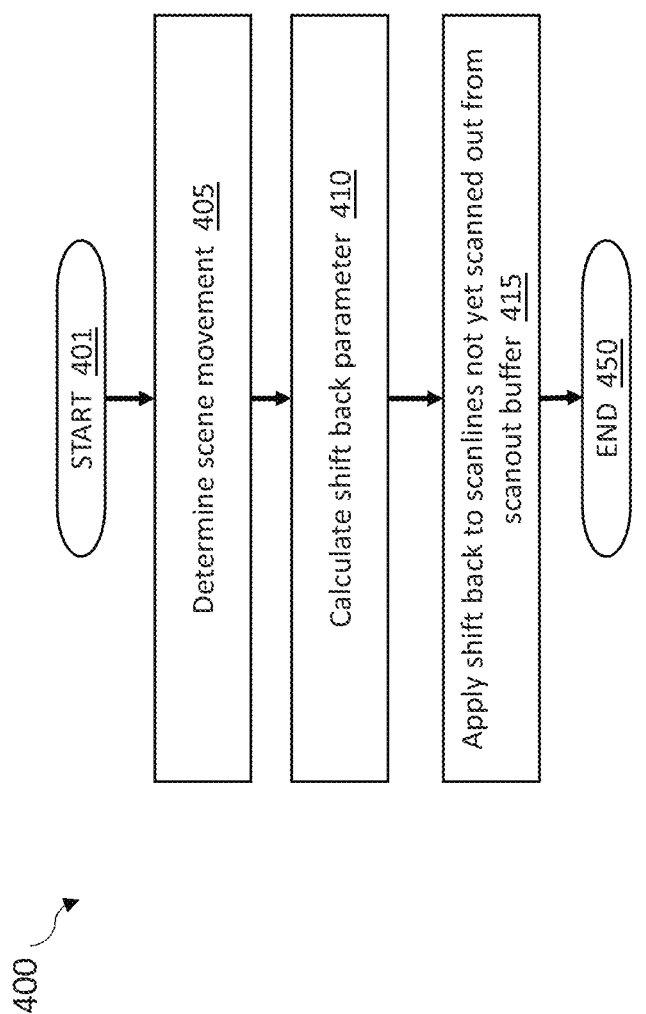
FIG. 4 is an illustration of a flow diagram of an example method to shift back a portion of scanout scanlines.

FIG. 4 is an illustration of a flow diagram of an example method 400 to shift back a portion of scanout scanlines. Method 400 starts at a step 401 and proceeds to a step 405. In the step 405, a determination is made whether a shift back parameter is necessary to be computed and applied. To determine the shift back parameter, the amount of scene movement detected or received as input can be utilized with other factors, such as the scene characteristics and the state of the scanout process. Scene characteristics can be the darkness of the scene, where very dark areas are more tolerant to small tearing artifacts, the lack of color variation at the point of tearing can result in a higher tearing artifact tolerance, and other characteristics. The state of the scanout buffer can also be a factor, such as if the buffer switch is estimated to occur when the scanout buffer is at the first or last scanline, as compared to the middle portion of scanlines. A potential situation in which the shift back application process may be bypassed can be when there is significant movement of a very dark scene at a point in the scanout process where the buffer switch occurs affecting the top or bottom scanlines of the scanout buffer. The resulting determination can determine that compute cycles can be utilized elsewhere and not apply a shift back parameter.

Proceeding to a step 410, a shift back parameter is calculated. The calculation utilizes the detected or received movement parameter. The shift back parameter can be a full amount of the detected scene shift, as computed from the movement parameter, or a portion thereof. Utilizing the scene characteristics, the movement parameter, the type of application being used to generate the scenes, or other factors, the shift back parameter can be a proportion of the scene shift amount. For example, viewing a VR nature scene may result in a determination that the shift back parameter be approximately equal to the shifted scene amount. In a very fast action gaming scene, such as a dogfight where there is very rapid movement and multiple direction changes, the shift back parameter can be a lesser proportion than 100% of the scene shift amount. Proceeding to a step 415, the shift back parameter is applied to scanlines in the newly designated scanout buffer that have not yet been scanned out for the current video image frame, i.e., the shift back process is applied to the set of scanlines in the newly designated scanout buffer corresponding to the unscanned set of scanlines from the previous scanout buffer. The method ends at a step 450.

Figure 5:
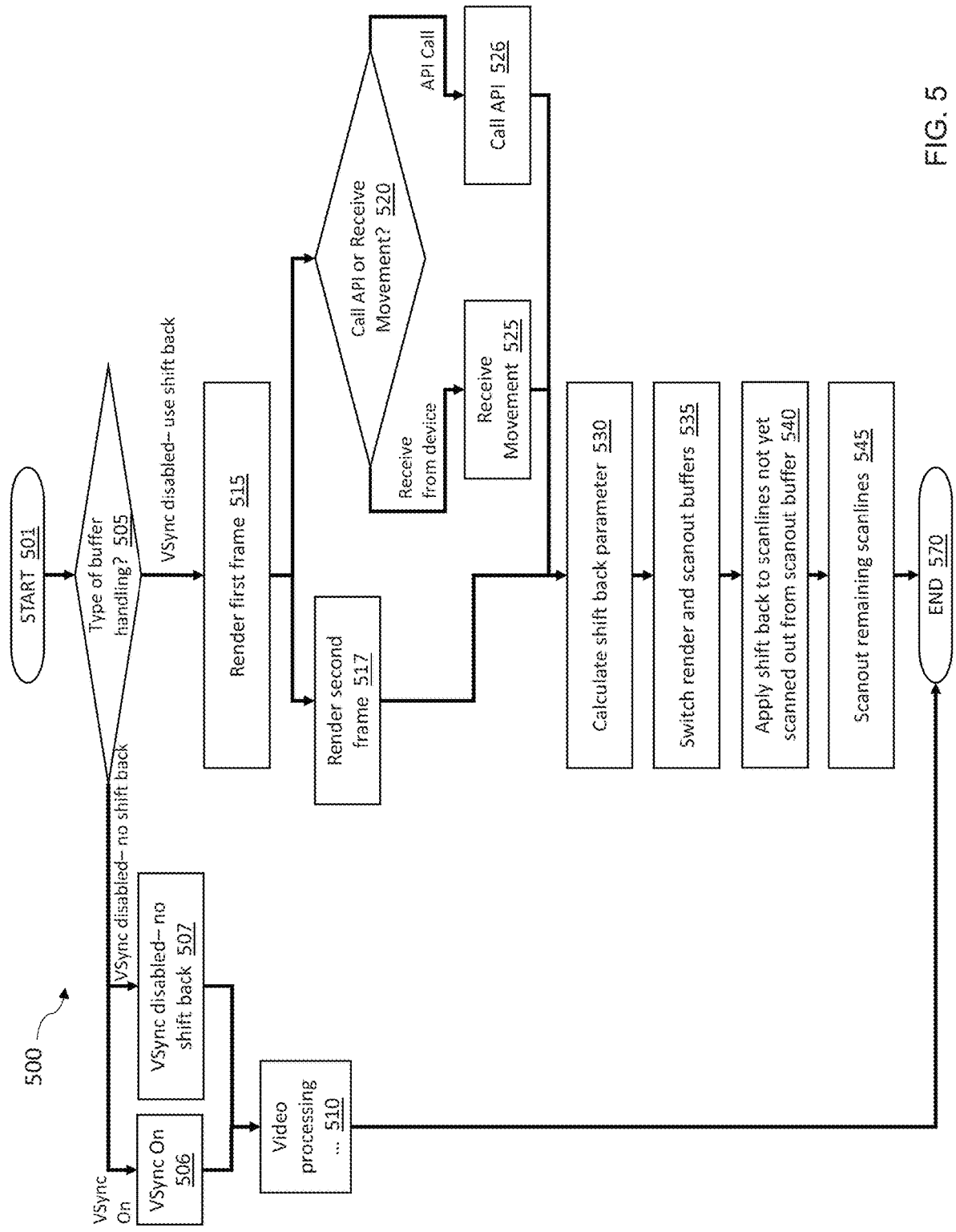
FIG. 5 is an illustration of a flow diagram of an example method to shift back scanlines utilizing received movement information.

FIG. 5 is an illustration of a flow diagram of an example method 500 to shift back scanlines utilizing received movement information. Method 500 starts at a step 501 and proceeds to a decision step 505. In the decision step 505, the processor determines the type of frame buffer handling operation that will be used. The type of buffer handling can be determined by the application that is generating the video, by hardware selection, or by a user selection, such as a configuration parameter. The method 500 can proceed to a step 506 if the VSync is turned on, proceed to a step 507 if the VSync is disabled and the shift back process is not being used, or proceed to a step 515 when the VSync is off and the shift back process will be utilized. Steps 506 and 507 are representative steps of other buffer handling processes and algorithms. There can be other types in addition to the examples described herein. Steps 506 and 507 can proceed to a step 510 to continue the video processing process according to their respective prescribed algorithms. After step 510, the method 500 ends at a step 570.

Returning to the step 515, a first frame can be rendered. The indicators first and second in this description refer to the order that the frames are rendered and do not indicate an ordinal position or a position within a video. Proceeding to a step 517, the render buffer can be assigned as the scanout buffer and the scanout buffer can be assigned as the render buffer, effectively swapping the two buffers. This can occur when the render process has completed updating the render buffer. The render process can indicate that the buffers can be swapped to allow the render process to begin rendering the subsequent video frame in the newly designated render buffer without overlaying the video frame already updated in the previous render buffer (now the newly designated scanout buffer). A triple buffer system can also be utilized in a round robin pattern. Once the buffers have been re-designated, a second, i.e., subsequent, frame of the video image can be rendered.

At an overlapping time with step 517, a decision step 520 can be executed. Decision step 520 determines how the video driver is going to receive a movement parameter. The movement parameter can be communicated to the video driver from a device, for example, through a wireless connection or through a USB cable, where the method 500 will proceed to a step 525. Alternatively, the movement parameter can be communicated to the video driver through an API call, where the method 500 will proceed to a step 526. In the step 525 and the step 526, the movement parameter is received by the video driver and used in the buffer handling algorithm.

Once either step 525 or step 526 is completed, and step 517 is completed, the method 500 proceeds to a step 530. In the step 530, a shift back parameter is calculated utilizing the second rendered frame and the movement parameter. In a step 535, the render and scanout buffers are switched. In a step 540, the shift back parameter is applied, through an algorithm, to the scanlines in the scanout buffer that have not yet been scanned out for the current frame being output to the device.

In a step 545, the remaining scanlines for the output frame are scanned out to the display device. In an alternative aspect, step 530 and step 535 can be executed in various orders and/or executed in parallel. In other aspects, step 530 can be executed after either step 525 or 526 is completed and does not need to wait for step 517 to complete. In other aspects, step 545 can execute while step 540 is executing. For example, when step 540 can complete its operation on a scanline. While step 545 is performing a scanout of that scanline, step 540 can continue processing the subsequent scanlines. The method 500 ends at the step 570.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method to adjust a video image frame, comprising:
   determining an effect of a video scene movement;
   calculating a shift back parameter utilizing a first frame buffer and a second frame buffer, wherein said first frame buffer comprises scanlines corresponding to a first video image frame and said second frame buffer comprises scanlines corresponding to a second video image frame, and said second frame buffer is assigned as a current scanout buffer; and
   applying a shift back process on a set of scanlines of said second frame buffer by utilizing said shift back parameter, said set of scanlines corresponding to an equivalent set of unscanned scanlines from said first frame buffer, further wherein a frame buffer operation synchronization constraint is disabled.

2. The method as recited in claim 1, wherein said synchronization constraint is a vertical synchronization (VSync) constraint.

3. The method as recited in claim 1, further comprising:
   receiving a movement parameter; and
   wherein said video scene movement utilizes said movement parameter.

4. The method as recited in claim 3, further comprising:
   communicating said movement parameter from a user device, wherein said user device is a computing device or a virtual reality (VR) display device.

5. The method as recited in claim 4, wherein said user device is said VR display device and wherein said movement parameter is proportional to a speed of a user's movement.

6. The method as recited in claim 4, wherein said user device is said computing device and wherein said movement parameter is proportional to a rate of video image scene changes in an application on said computing device.

7. The method as recited in claim 1, further comprising:
   receiving a buffer handling parameter; and
   determining a frame buffer operation utilizing said buffer handling parameter.

8. The method as recited in claim 1, wherein a third frame buffer is utilized in assigning current scanout and render buffers according to a round robin pattern with said first frame buffer and said second frame buffer.

9. The method as recited in claim 1, wherein each of said first frame buffer and said second frame buffer comprise one or more video image frames, wherein said shift back parameter comprises an array of shift back parameters, and further wherein each video image frame in said second frame buffer utilizes a corresponding shift back parameter in said array of shift back parameters.

10. A non-transitory computer-readable medium having a series of operating instructions stored thereon that directs a data processing apparatus when executed thereby to perform operations to adjust a video image frame buffer, having operations comprising:
    determining an effect of a video scene movement;
    calculating a shift back parameter utilizing a first frame buffer and a second frame buffer, wherein said first frame buffer comprises scanlines corresponding to a first video image frame and said second frame buffer comprises scanlines corresponding to a second video image frame, and said second frame buffer is assigned as a current scanout buffer; and
    applying a shift back process on a set of scanlines of said second frame buffer by utilizing said shift back parameter, said set of scanlines corresponding to an equivalent set of unscanned scanlines from said first frame buffer, further wherein a frame buffer operation synchronization constraint is disabled.

11. The non-transitory computer-readable medium as recited in claim 10, wherein said synchronization constraint is a vertical synchronization (VSync) constraint.

12. The non-transitory computer-readable medium as recited in claim 10, wherein said computer program product is part of a video driver.

13. The non-transitory computer-readable medium as recited in claim 12, wherein said video driver is executed within a graphics processing unit (GPU).

14. The non-transitory computer-readable medium as recited in claim 10, further comprising:
    receiving a movement parameter; and
    wherein said video scene movement utilizes said movement parameter.

15. The non-transitory computer-readable medium as recited in claim 14, further comprising:
    communicating said movement parameter from a user device, wherein said user device is a computing device or a virtual reality (VR) display device.

16. The non-transitory computer-readable medium as recited in claim 15, wherein said user device is said VR display device and wherein said movement parameter is proportional to a speed of a user's movement, or said user device is said computing device and wherein said movement parameter is proportional to a speed of video image frame changes in an application on said computing device.

17. The non-transitory computer-readable medium as recited in claim 10, further comprising:
   receiving a buffer handling parameter; and
   determining a frame buffer operation utilizing said buffer handling parameter.

18. A video image frame adjustment system, comprising:
   a buffer handler operable to direct a frame buffer operation;
   a video renderer operable to render one or more video image frames and store said video image frames in a buffer by utilizing said buffer handler; and
   a video adjustor operable to adjust a set of scanlines of a rendered second video image frame from said video renderer utilizing a rendered first video image frame from said video renderer when said second video image frame is stored in said buffer, and said set of scanlines corresponds to an equivalent set of unscanned scanlines of said first video image frame, further wherein said frame buffer operation indicates a disabled synchronization constraint.

19. The video image frame adjustment system as recited in claim 18, wherein said synchronization constraint is a vertical synchronization (VSync) constraint.

20. The video image frame adjustment system as recited in claim 18, wherein said video image frame adjustment system is a graphics processing unit (GPU).

21. The video image frame adjustment system as recited in claim 18, further comprising:
   a receiver, operable to receive a movement parameter; and
   wherein said video adjustor utilizes said movement parameter.

22. The video image frame adjustment system as recited in claim 21, wherein said movement parameter is generated by a virtual reality (VR) device or a computing device.

23. The video image frame adjustment system as recited in claim 18, wherein said buffer handler receives a buffer handling parameter, and said buffer handler is operable to adjust said frame buffer operation.

24. The video image frame adjustment system as recited in claim 18, wherein said video image frames are received from a VR application, or received from a computing system.

25. The video image frame adjustment system as recited in claim 18, further comprising:
   a display, operable to display said second video image frame.

* * * * *